United States Patent [19]

Horie et al.

[11] Patent Number: 5,075,124

[45] Date of Patent: Dec. 24, 1991

[54] JAMS TREATED AT HIGH PRESSURE

[75] Inventors: Yu Horie, Nishinomiya; Kunio Kimura, Ibaraki; Masao Ida, Suita, all of Japan

[73] Assignee: Kabushiki Kaisha Meidi-ya Shokuhin Kojo, Osaka, Japan

[21] Appl. No.: 612,960

[22] Filed: Nov. 15, 1990

[30] Foreign Application Priority Data

Nov. 17, 1989 [JP] Japan .................................. 1-299975
Apr. 22, 1990 [JP] Japan .................................. 2-105898
May 25, 1990 [JP] Japan .................................. 2-136684

[51] Int. Cl.$^5$ ........................ A23L 3/015; A23L 1/064
[52] U.S. Cl. .................................... 426/577; 426/639; 426/103
[58] Field of Search .................... 426/577, 103, 639

[56] References Cited

U.S. PATENT DOCUMENTS

| | | | |
|---|---|---|---|
| 2,185,064 | 12/1939 | Reich | 426/577 |
| 2,459,431 | 1/1949 | Johnson et al. | 426/577 |
| 3,034,901 | 5/1962 | Leo et al. | 426/577 |
| 4,562,080 | 12/1985 | Tenn | 426/577 |
| 4,686,106 | 8/1987 | Ehrlich et al. | 426/577 |

Primary Examiner—Jeanette Hunter
Attorney, Agent, or Firm—Wegner, Cantor, Mueller & Player

[57] ABSTRACT

Jams including jellies, preserves, purees, fruit sauces and the like obtained by subjecting a mixture of raw materials to a high pressure treatment without heating is disclosed. The high pressure treatment is conducted at room temperature and a pressure of 500 to 10,000 kg/cm$^2$ for 1 to 1,800 minutes.

10 Claims, No Drawings

JAMS TREATED AT HIGH PRESSURE

FIELD OF THE INVENTION

The present invention relates to food, particularly, fruit products treated at a high pressure. More particularly, it relates to jams including jellies, preserves, purees, fruit sauces and the like obtained by a treatment at high pressure, which maintain color and taste of fresh fruits used as raw materials.

BACKGROUND OF THE INVENTION

It has been found that, when food is held at a high pressure such as several thousands atm., denaturation of protein as well as inactivation and death of microorganisms can be caused, and hence, various trials for employing such a high pressure treatment as cooking, processing and storing means of food have been made.

However, a heat treatment has been widely employed as cooking, processing and storing means of food, and no food product which is obtained by successfully employing such a high pressure treatment in place of a heat treatment and can be marketed has yet been found.

OBJECTS OF THE INVENTION

Under these circumstances, in order to put a high pressure treatment of food to practical use, the present inventors have intensively studied. As a result, it has been found that such a treatment is suitable for the production of processed fruit products, particularly, jams including jellies, preserves, purees, fruit sauces and the like, and a product maintaining color and taste of fresh fruits which can be marketed can be obtained without conducting the conventional heat treatment which has hitherto been considered to be essential to the production of jams and the like.

That is, the main object of the present invention is to provide jams obtained by treatment at a high pressure without the conventional heat treatment.

This object as well as other objects and advantages of the present invention will become apparent to those skilled in the art from the following description.

SUMMARY OF THE INVENTION

According to the present invention, there are provided jams obtained by subjecting a mixture of raw materials to a high pressure treatment without heating. According to the present invention, when a mixture of raw materials is subjected to a high pressure treatment under predetermined conditions, permeation of a solution of sugar into fruits as well as sterilization can be conducted simultaneously, and it is not necessary to conduct the conventional heat treatment at all. Thus, novel jams maintaining color and taste of fresh fruits can be obtained.

DETAILED DESCRIPTION OF THE INVENTION

The jams of the present invention includes jams, jellies, preserves, marmalades, purees, fruit sauces, fruit butters and the like.

The raw materials used in the present invention are not specifically limited and they may be the conventional raw materials which are normally used, for example, various fruits, juice, sugars, acidulants, other additives (i.e., pectin, vitamin C). Further, the amount of each raw material in a mixture of raw materials is not specifically limited and any conventional formulation can be employed.

In order to produce the jams of the present invention, firstly, a mixture of raw materials obtained by mixing the desired raw materials according to the conventional manner is filled in a desired container for marketing which can be externally pressurized such as a flexible plastic container or the like. After sealing of the container, it is subjected to a high pressure treatment at room temperature and a pressure of 500 to 10,000 $kg/cm^2$, preferably 4,000 to 6,000 $kg/cm^2$ for 1 to 1,800 minutes, preferably 1 to 30 minutes. This high pressure treatment can be conducted by using a known pressurizing apparatus by applying a pressure with a pressurized fluid such as air, water or the like. When the pressure is too low and the time of treatment is too short, the desired effect is scarcely obtained. On the other hand, excessive high pressure and treatment for a long period of time are not preferred from the viewpoint of workability and economy.

Fruit peels used for the production of marmalades are normally pre-treated by heating. However, it has also been found that such a pre-treatment can be conducted by a high pressure treatment under the same conditions in place of the conventional heating. For example, fresh fruit peels are sliced in a suitable size and mixed with an aqueous citric acid solution and the mixture is placed in a flexible container. Then, the container is sealed and it is subjected to a high pressure treatment according to the same manner as that described above. The peels thus obtained can be used according to the same manner as those obtained by the conventional heat treatment.

The jams of the present invention can be used as the conventional jams to enjoy color and taste of fresh fruits. In addition, in order to maintain fresh color and taste, it is preferred that the jams of the present invention are marketed through a chilled route.

The following Examples further illustrate the present invention in detail but are not to be construed to limit the scope thereof.

EXAMPLE 1

Strawberry jam

| Ingredients | % by weight |
| --- | --- |
| Strawberry (dehulled, washed with water) | 50 |
| Sugar | 36.3 |
| Citric acid | 0.15 |
| Vitamin C | 0.1 |
| Pectin | 0.5 |
| Water | 12.95 |

According to the above formulation, the ingredients were mixed and the mixture was placed in plastic containers without heating. After sealing of the containers, they were placed in a high pressure treatment apparatus and pressurized at 4000 $kg/cm^2$ for 15 minutes to obtain the desired preserve style strawberry jam of 40° Brix.

EXAMPLE 2

Orange marmalade

| Ingredients | % by weight |
| --- | --- |
| Pre-treated orange peels | 25 |
| Orange pulp | 30 |
| Sugar | 31.5 |

-continued

| Ingredients | % by weight |
| --- | --- |
| Citric acid | 0.35 |
| Vitamin C | 0.2 |
| Pectin | 0.4 |
| Water | 12.55 |

According to the same manner as that described in Example 1, a mixture of the raw materials was subjected to a high pressure treatment to obtain the desired orange marmalade of 35° Brix. The orange peels used were pretreated as follows.

After fresh fruits were washed with water, peels were removed and sliced in a suitable size. Then, they were dipped in a 50 mg% aqueous vitamin C solution and the sliced peels were washed with water. They were drained off and mixed with a 2% aqueous citric acid solution in the weight ratio of 1:1. After they were placed in flexible containers and sealed, a high pressure treatment was conducted according to the same manner as that described above. The pre-treated orange peels thus obtained were further washed with water and drained off. Then, they were used for the production of the above marmalade.

Taste of various jams thus obtained (products of the present invention) and that of jams obtained by the conventional heat treatment (the conventional products) were compared by using 30 panelists according to a two-point comparison method. The results are shown in Table 1.

TABLE 1

| Jams | Number of panelists who judged that the conventional jam is better | Number of panelists who judged that the jam of the present invention is better |
| --- | --- | --- |
| Strawberry | 6 | 24 |
| Kiwi | 6 | 24 |
| Fig | 2 | 28 |
| Orange marmalade | 5 | 25 |
| Grapefruit marmalade | 1 | 29 |
| Apple | 9 | 21 |
| Peach (white) | 2 | 28 |

As seen from Table 1, the jams of the present invention have excellent taste and flavor in comparison with the conventional jams subjected to a heat treatment.

EXAMPLE 3
Fruit sauce (strawberry)

| Ingredients | % by weight |
| --- | --- |
| Strawberry (dehulled, washed with water) | 50 |
| Sugar | 36.3 |
| Citric acid | 0.15 |
| Vitamin C | 0.1 |
| Pectin | 0.1 |
| Water | 13.35 |

According to the above formulation, the ingredients were mixed and the mixture was placed in plastic containers without heating. After sealing of the containers, they were placed in a high pressure treatment apparatus and were pressurized at 4000 kg/cm$^2$ for 10 minutes to obtain the desired fruit sauce of strawberry of 40° Brix.

Taste of various fruit sauces thus obtained (the products of the present invention) and that of fruit sauces obtained by the conventional heat treatment (the conventional product) were compared by using 30 panelists according to two-point comparison method. The results are shown in Table 2.

TABLE 2

| Fruit sauces | Number of panelists who judged that the conventional fruit sauce is better | Number of panelists who judged that the fruit sauce of the present invention is better |
| --- | --- | --- |
| Strawberry | 4 | 26 |
| Kiwi | 5 | 25 |
| Fig | 1 | 29 |
| Blueberry | 6 | 24 |
| Apple | 5 | 25 |
| Peach (white) | 3 | 27 |

As seen from Table 2, the fruit sauces of the present invention have excellent taste and flavor in comparison with the conventional fruit sauces subjected to a heat treatment.

What is claimed is:

1. A jam prepared by a process comprising:
   mixing raw materials of the jam, said raw materials including a fruit product, and
   subjecting the mixture to a high pressure treatment at a pressure of 500 to 10,000 kg/cm$^2$ for 1 to 1,800 minutes without heating.

2. The jam according to claim 1, wherein the high pressure treatment is conducted at room temperature.

3. The jam according to claim 1, wherein said process further comprises adding a mixture of said raw material to a container and sealing said container prior to subjecting the mixture to said high pressure treatment.

4. The jam according to claim 1, wherein said raw materials further include sugar, citric acid, pectin and water.

5. The jam according to claim 1, wherein the high pressure treatment is conducted at a pressure of 4,000 to 6,000 kg/cm$^2$ for 1 to 30 minutes.

6. A process for preparing a jam comprising:
   mixing raw materials of the jam, said raw materials including a fruit product, and
   subjecting the mixture to a high pressure treatment at a pressure of 500 to 10,000 kg/cm$^2$ for 1 to 1,800 minutes without heating.

7. The process according to claim 6, wherein the high pressure treatment is conducted at room temperature.

8. The process according to claim 6, wherein said process further comprises adding a mixture of said raw materials to a container and sealing said container prior to subjecting the mixture to said high pressure treatment.

9. The process according to claim 6, wherein said raw materials further include sugar, citric acid pectin and water.

10. The process according to claim 6, wherein the high pressure treatment is conducted at a pressure of 4,000 to 6,000 kg/cm$^2$ for 1 to 30 minutes.

* * * * *